United States Patent
Kim

(10) Patent No.: US 7,362,531 B2
(45) Date of Patent: Apr. 22, 2008

(54) CONTROLLING HARD DISK DRIVE BASED ON PORTABLE TERMINAL MOVEMENTS

(75) Inventor: Ji-Young Kim, Suwon-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 36 days.

(21) Appl. No.: 11/324,227

(22) Filed: Jan. 4, 2006

(65) Prior Publication Data

US 2006/0215303 A1   Sep. 28, 2006

(30) Foreign Application Priority Data

Mar. 28, 2005   (KR)   ........................ 10-2005-0025452

(51) Int. Cl.
*G11B 19/02*   (2006.01)

(52) U.S. Cl. ............................................. 360/69

(58) Field of Classification Search ................. 360/60, 360/69, 55; 345/156; 342/357.11; 700/138; 704/243; 84/636; 455/420
See application file for complete search history.

(56) References Cited

U.S. PATENT DOCUMENTS

| | | | |
|---|---|---|---|
| 6,005,736 A | 12/1999 | Schreck | |
| 6,992,580 B2* | 1/2006 | Kotzin et al. | 340/539.11 |
| 7,136,680 B2* | 11/2006 | Leizerovich et al. | 455/574 |
| 7,191,089 B2* | 3/2007 | Clifford et al. | 702/141 |
| 2004/0193413 A1* | 9/2004 | Wilson et al. | 704/243 |
| 2005/0126370 A1* | 6/2005 | Takai et al. | 84/636 |
| 2006/0097983 A1* | 5/2006 | Haggman et al. | 345/156 |
| 2006/0109581 A1* | 5/2006 | Lee et al. | 360/60 |
| 2006/0128370 A1* | 6/2006 | Tahara | 455/420 |
| 2006/0262012 A1* | 11/2006 | Nishikata et al. | 342/357.11 |
| 2007/0005175 A1* | 1/2007 | Konig et al. | 700/138 |

FOREIGN PATENT DOCUMENTS

WO   WO 00/72314 A   11/2000

* cited by examiner

*Primary Examiner*—Fred F. Tzeng
(74) *Attorney, Agent, or Firm*—Roylance, Abrams, Berdo & Goodman, LLP

(57) ABSTRACT

A portable wireless communication terminal includes a sensor to detect a movement of the portable wireless communication terminal and output a first signal based on an acceleration of the movement and a second signal based on a velocity of the movement and a controller to control a hard disk drive (HDD) in response to both the first and second signals.

16 Claims, 5 Drawing Sheets

CONTROLLING HARD DISK DRIVE BASED ON PORTABLE TERMINAL MOVEMENTS

PRIORITY

This application claims priority under 35 U.S.C. § 119 to an application filed in the Korean Intellectual Property Office on Mar. 28, 2005 and assigned Serial No. 2005-25452, the contents of which are herein incorporated by reference.

BACKGROUND OF THE INVENTION

1. Field of the Invention

The present invention relates generally to a system for controlling a hard disk drive in response to movements of a portable terminal.

2. Description of the Related Art

The rapid proliferation of portable terminals has spurred the development of multi-functional portable terminals. A portable terminal as referred to throughout the disclosure may be a portable wireless communication terminal for conducting wireless communication. Portable terminals may perform a variety of functions beyond traditional call functionality in order to meet user demands. Due to drastic wireless network evolution, there is an increased use of the high end portable terminals and high quality services with diverse and dynamic contents. Due to an increased demand for large-volume contents in the changed environment, a Hard Disk Drive (HDD) offering a large memory capacity may be mounted as an auxiliary memory in portable terminals. To protect the HDD from being damaged, these portable terminals may be configured to park the HDD during movements in order to prevent data reading and writing.

However, the HDD parking at times may be triggered even by a slight movement of the portable terminal, even if the movement is not sufficient to damage the HDD.

SUMMARY OF THE INVENTION

A portable wireless communication terminal includes a sensor to detect a movement of the portable wireless communication terminal and output a first signal based on an acceleration of the movement and a second signal based on a velocity of the movement and a controller to control a hard disk drive (HDD) in response to both the first and second signals.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

Figure 1:
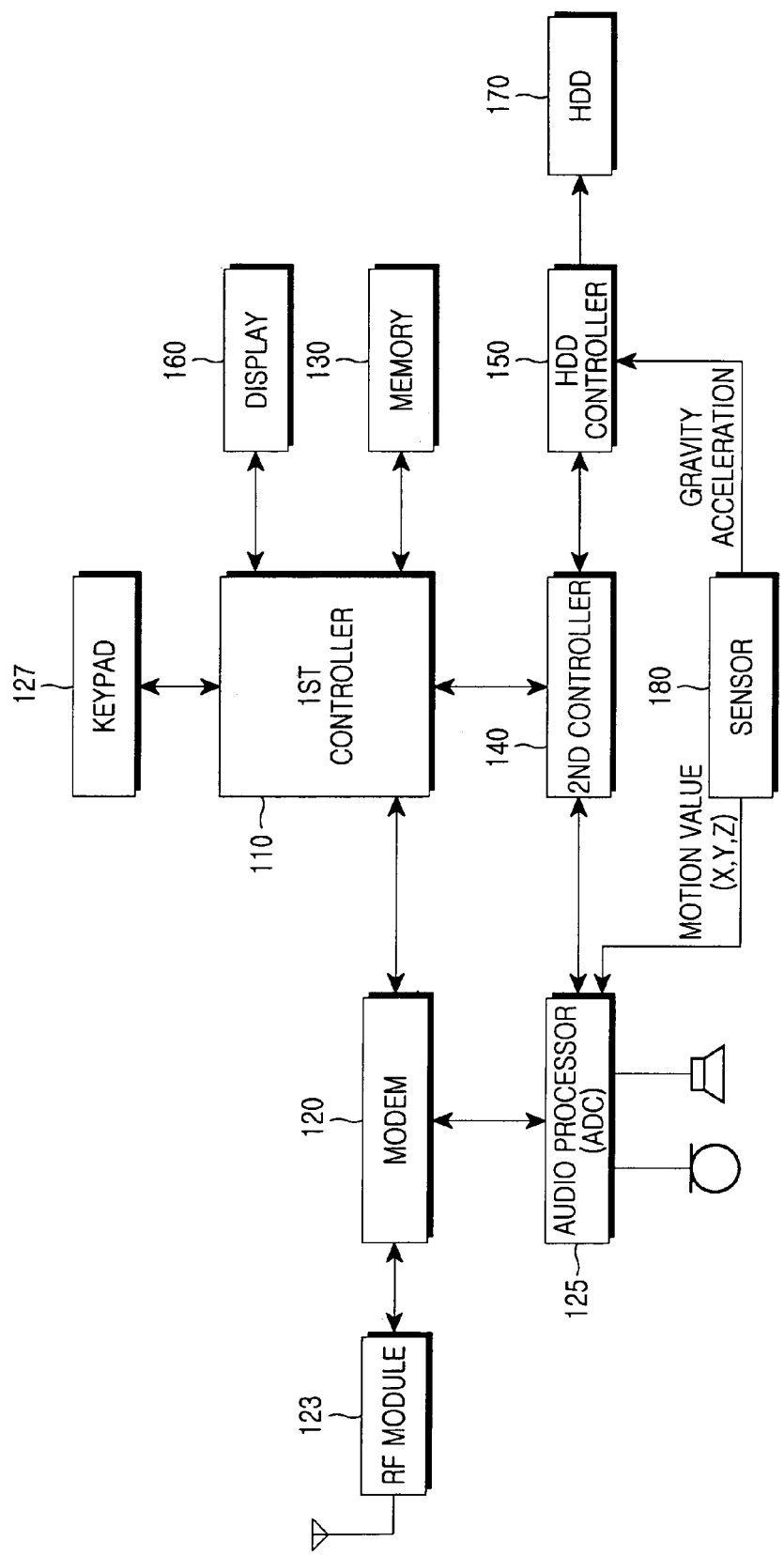
FIG. 1 is a block diagram of a portable terminal according to an exemplary embodiment of the present invention.

FIG. 1 is a block diagram of a portable terminal according to an exemplary embodiment of the present invention. A portable terminal as referred to throughout the disclosure is a portable wireless communication terminal for conducting wireless communication including but not limited to a mobile telephone, PDA and computer.

Referring to FIG. 1, a Radio Frequency (RF) module 123 is responsible for wireless communications in the portable terminal and is coupled to a first controller 110 and, via 110, a second controller 140. The RF module 123 includes an RF transmitter for frequency upconversion and amplification of a transmission signal and an RF receiver for low-noise-amplification and frequency downconversion of a received signal. A MODEM 120 is provided with a transmitter for encoding and modulating the transmission signal and a receiver for demodulating and decoding the received signal.

An audio processor 125 may have Coders-Decoders (CODECs). The CODECs are a data CODEC for processing packet data and an audio CODEC for processing an audio signal such as voice. The audio processor 125 converts a digital audio signal received from the MODEM 120 to an analog signal at the audio CODEC, for reproduction. It also converts an analog audio signal received through a microphone to a digital audio signal and provides the digital audio signal to the MODEM 120. The audio processor 125 includes an Analog-to-Digital Converter (ADC) for performing the foregoing analog to digital or digital to analog conversions. According to the exemplary embodiment of the present invention, the ADC converts an analog signal representing a motion value received from a sensor 180 to a digital motion value and outputs the digital signal to a second controller 140.

A memory 130 can have a program memory and a data memory. The program memory can store programs for controlling the typical operations of the portable terminal and programs for controlling parking and unparking of an HDD according to the exemplary embodiment of the present invention. The data memory temporarily stores data generated during execution of the programs.

A first controller 110 provides overall control to the portable terminal. The MODEM 120 and the CODECs can be incorporated into the first controller 110. If the portable terminal co-functions as a Personal Digital Assistant (PDA), the first controller 110 may control phone functions and the second controller 140 which in turn may control PDA functionality.

A display 160 displays user data received from the first controller 110. A Liquid Crystal Display (LCD) can be used for the display 160. In this case, the display 160 is provided with an LCD controller, a memory for storing video data, and an LCD display device. In the case where the LCD is implemented in a touch screen fashion, the display 160 can function as an input device. A keypad 127 includes alpha-numerical keys and function keys.

The sensor 180 is a three-axis (X, Y and Z axis-) acceleration sensor for detecting the movement of the portable terminal with respect to the mutually orthogonal X, Y Z axes. The sensor 180 may output an acceleration signal based on an acceleration of the detected movement to an HDD controller 150 and output a movement measurement signal based on a measurement of the movement with respect to the X, Y and Z-axes. The foregoing signals may be outputted to the ADC of the audio processor 125 in accordance with the exemplary embodiment of the present invention. An acceleration of the movement as referred to throughout the disclosure may be any acceleration in the movement including but not limited to an acceleration with respect to the X, Y, Z axes and a vertical acceleration. A measurement of the movement, as referred to throughout the disclosure, can be a measurement of any aspect of the movement including but not limited to a measurement of a velocity with respect to the X, Y, Z axes. With respect to the description related to an acceleration signal throughout the disclosure, a determination may be made by a controller whether the acceleration signal indicates that the acceleration of the movement exceeds a predetermined threshold value. If the determination is made by a controller that the acceleration of the movement exceeds the predetermined threshold value (e.g., a threshold value referred to as zero G), a further determination may be made by a controller whether to park the HDD based on the movement measurement signal (e.g., signal outputted based on a velocity of the movement).

The HDD controller 150 controls an HDD 170. Under the control of the second controller 140, the HDD controller 150 reads data from the HDD 170 or writes data on the HDD 170.

In accordance with the exemplary embodiment of the present invention, the HDD controller 150 provides the acceleration received from the sensor 180 to the second controller 140. It also parks the HDD 170 under the control of the second controller 140, thereby protecting the HDD 170 against damage. The HDD controller 150 may be a Transition Integrated Circuit (TIC).

The second controller 140 may determine the movement of the portable terminal based on the acceleration signal received from the HDD controller 150 and may further determine whether to park or unpark the HDD 170 based on the movement measurement signal received from the ADC of the audio processor 125. After determining to park the HDD 170 according to the movement measurement signal, the second controller 140 controls the HDD controller 150 to park the HDD 170. After determining not to park the HDD 170 according to the movement measurement signal, the second controller 140 controls the HDD controller 150 to leave the HDD 170 unparked since the movement of the portable terminal will not damage the HDD 170.

For example, the second controller 140 may decide not to park the HDD 170 when the movement measurement signal received from the sensor 180 indicates that the user is walking, jogging, or driving or that the movement is causing a load not greater than the limit load of the HDD 170 (for example, at or below a limit load of about 200 g for a 3 GB HDD).

The second controller 140 may control the PDA functionality under the control of the first controller 110 when the portable terminal co-functions as a PDA, as described before.

The process of determining as to whether to park the HDD will be described in great detail with reference to FIG. 5.

Figure 5:
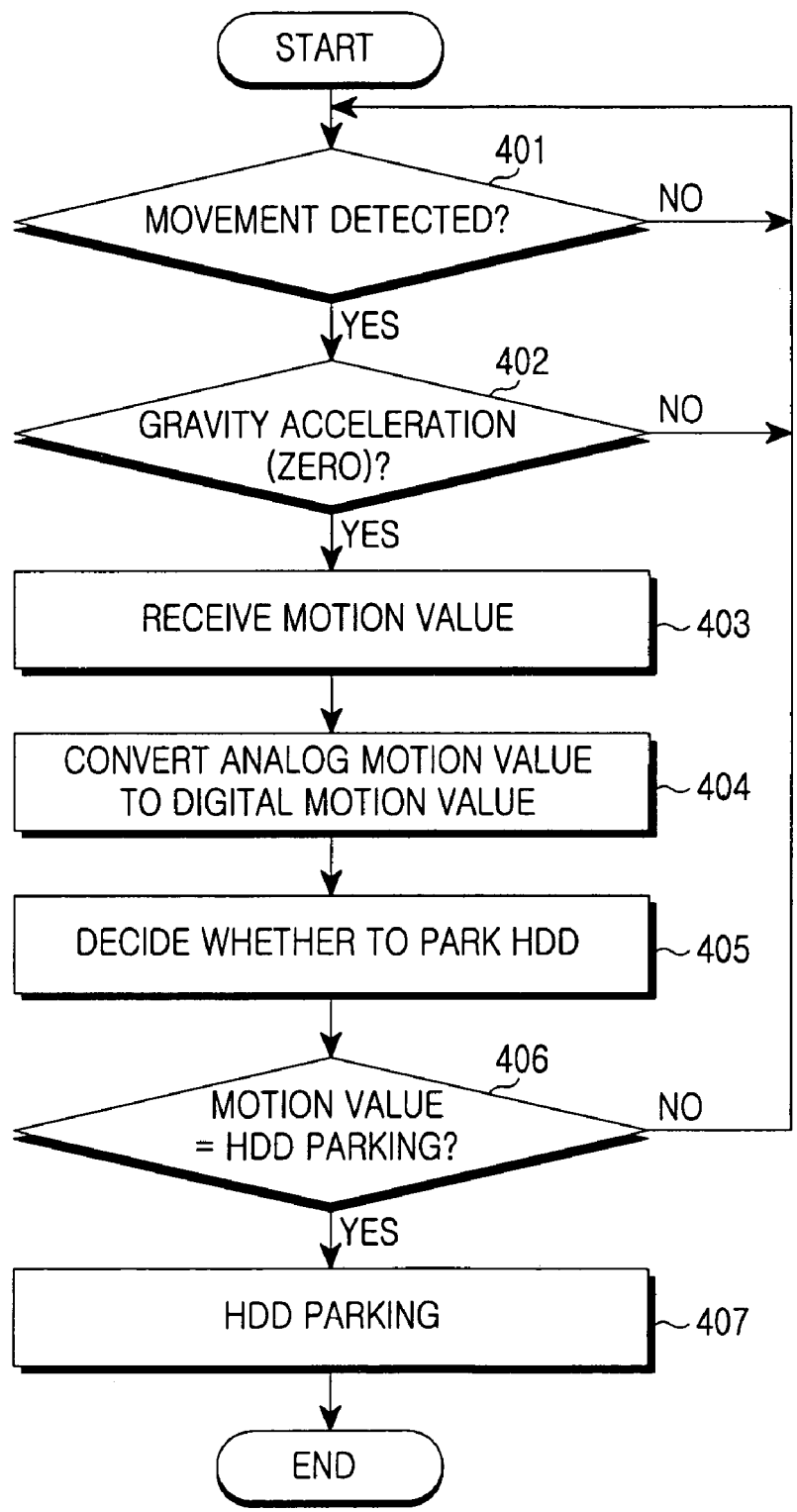
FIG. 5 is a flowchart illustrating an operation for judging whether to park an HDD in the portable terminal according to an exemplary embodiment of the present invention.

FIG. 5 is a flowchart illustrating an operation for determining whether to park an HDD in the portable terminal according to an exemplary embodiment of the present invention.

Referring to FIGS. 1 and 5, if the portable terminal makes a movement, the sensor 180 detects the movement in step 401. In step 402, the sensor 180 senses the acceleration of the movement and provides it to the HDD controller 150.

The HDD controller 150 provides an acceleration signal outputted based on the acceleration of the movement to the second controller 140 and the second controller 140 determines that the portable terminal is moving based on the acceleration signal (e.g., based on whether the acceleration signal indicates that the acceleration of the movement is above a threshold value—the threshold value may be referred as the zero G).

The sensor 180 also provides a movement measurement signal derived from X, Y and Z-axis measurement values (e.g., X, Y and Z axis components of the velocity of the movement) of the movement of the portable terminal to the ADC of the audio processor 125. The ADC receives the movement measurement signal from the sensor 180 in step 403 and converts the analog movement measurement signal to a digital movement measurement signal and provides it to the second controller 140 in step 404.

In step 405, the second controller 140 determines whether to park the HDD 170 according to the movement measurement signal. After determining to park the HDD 170 according to the movement measurement signal in step 406, the second controller 140 controls the HDD controller 150 to park the HDD 170 in step 407. On the contrary, after determining not to park the HDD 170 according to the movement measurement signal in step 406, the second controller 140 leaves the HDD 170 unparked because the movement of the portable terminal is not serious enough to damage the HDD 170.

Figure 2:
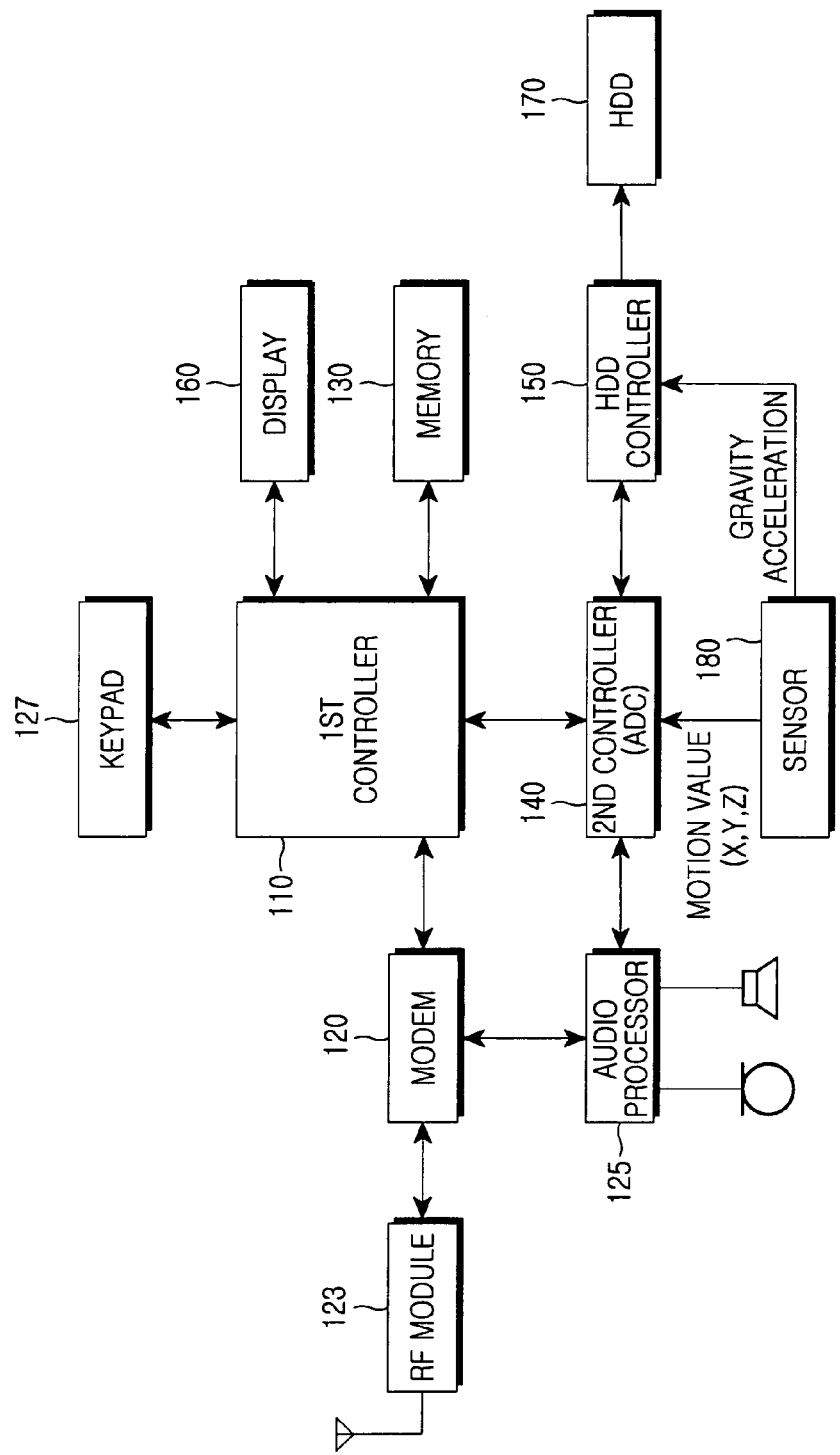
FIG. 2 is a block diagram of a portable terminal according to another exemplary embodiment of the present invention.

FIG. 2 is a block diagram of a portable terminal according to another embodiment of the present invention.

Referring to FIG. 2, the sensor 180 may be a three-axis (X, Y and Z axis-) acceleration sensor for detecting the movement of the portable terminal with respct to the mutually orthogonal three axes. The sensor 180 provides an acceleration signal to the HDD controller 150 after detecting the movement and outputs an analog movement measurement signal derived from the X, Y and Z-axis measurement values (e.g., X, Y and Z axis components of the velocity of the movement) of the portable terminal to the second controller 140 in the second embodiment of the present invention.

The HDD controller 150 controls the HDD 170. Under the control of the second controller 140, the HDD controller 150 reads data from the HDD 170 or writes data on the HDD 170.

In accordance with the second embodiment of the present invention, the HDD controller 150 provides the acceleration signal received from the sensor 180 to the second controller 140. It also parks the HDD 170 under the control of the second controller 140, thereby protecting the HDD 170 against damage. The HDD controller 150 may be a TIC.

The second controller 140 determines the movement of the portable terminal based on the acceleration signal received from the HDD controller 150. The second controller 140 includes an ADC. In the second embodiment of the present invention, the ADC converts an analog movement measurement signal received from the sensor 180 to a digital movement measurement signal.

The second controller 140 judges whether to park the HDD 170 based on the digital movement measurement signal. After determining to park the HDD 170 according to the movement measurement signal, the second controller 140 controls the HDD controller 150 to park the HDD 170. After determining not to park the HDD 170 according to the movement measurement signal, the second controller 140 leaves the HDD 170 unparked, considering that the movement of the portable terminal will not damage the HDD 170.

The second controller 140 decides not to park the HDD 170 when the movement measurement signal received from the sensor 180 indicates that the user is walking, jogging, or driving or that the movement is causing a load not greater than the limit load of the HDD 170, for example, at or below a limit load of about 200 g for a 3 GB HDD.

The second controller 140 may control the PDA functionality under the control of the first controller 110 when the portable terminal co-functions as a PDA, as described before.

The process of determining whether the HDD is to be parked in the portable terminal having the configuration illustrated in FIG. 2 will be described in great detail with reference to FIG. 5.

FIG. 5 is a flowchart illustrating an operation for judging whether to park the HDD in the portable terminal according to the exemplary embodiment of the present invention.

Referring to FIGS. 2 and 5, if the portable terminal makes a movement, the sensor 180 detects the movement in step 401. In step 402, the sensor 180 senses the acceleration and provides it to the HDD controller 150.

The HDD controller 150 provides the acceleration signal to the second controller 140 and the second controller 140 determines that the portable terminal is moving based on the acceleration signal.

The sensor 180 also provides a movement measurement signal derived from X, Y and Z-axis measurement values of the movement of the portable terminal to the ADC of the second controller 140. The ADC receives the movement measurement signal from the sensor 180 in step 403 and converts the analog movement measurement signal to a digital movement measurement signal and provides it to the second controller 140 in step 404.

In step 405, the second controller 140 determines whether to park the HDD 170 according to the movement measurement signal. After determining to park the HDD 170 according to the movement measurement signal in step 406, the second controller 140 controls the HDD controller 150 to park the HDD 170 in step 407. On the contrary, after determining not to park the HDD 170 according to the movement measurement signal in step 406, the second controller 140 keeps the HDD 170 unparked, considering that the movement of the portable terminal will not damage the HDD 170.

Figure 3:
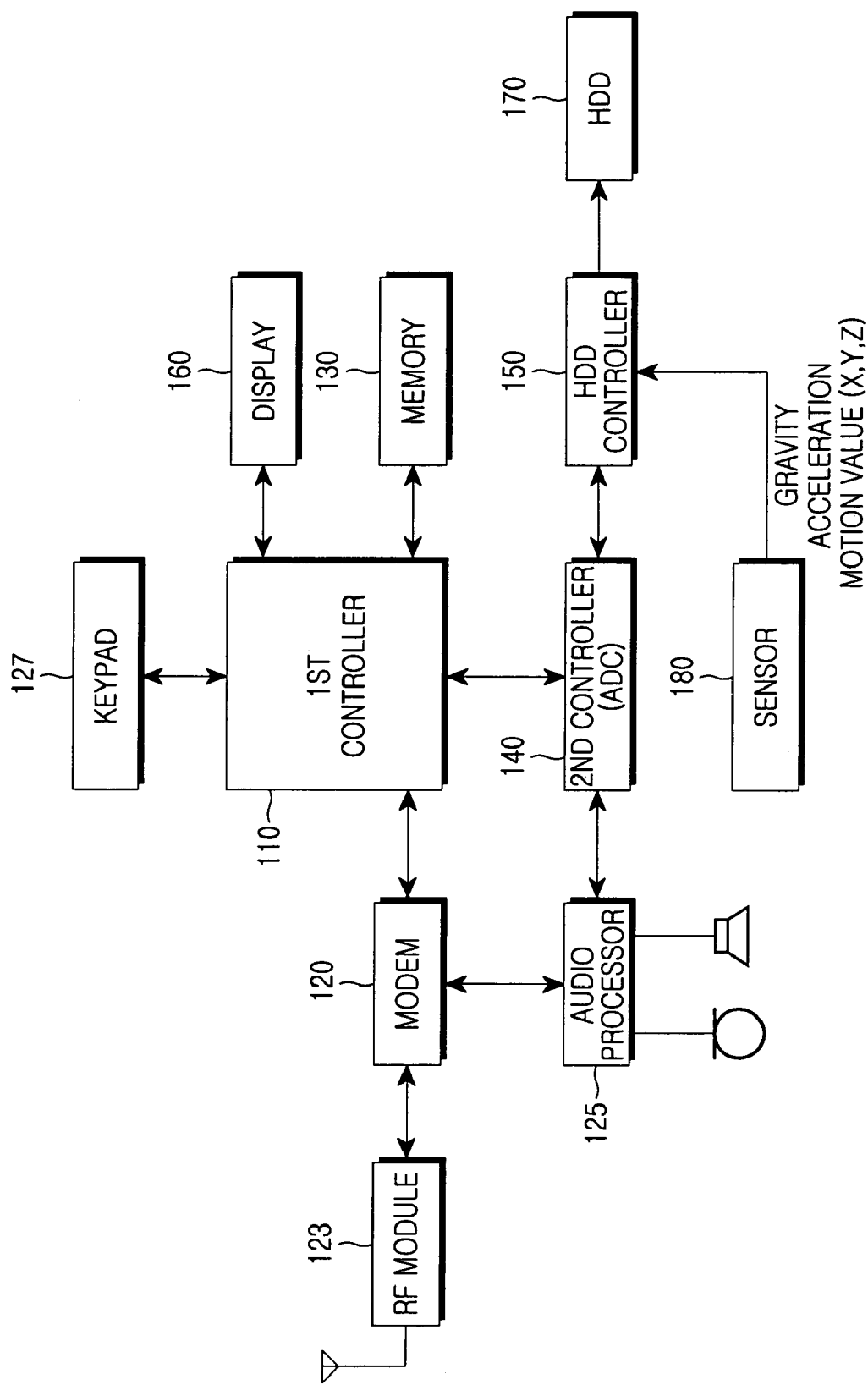
FIG. 3 is a block diagram of a portable terminal according to a third exemplary embodiment of the present invention.

FIG. 3 is a block diagram of a portable terminal according to a third embodiment of the present invention.

Referring to FIG. 3, the sensor 180 may be a three-axis (X, Y and Z axis-) acceleration sensor for detecting the movement of the portable terminal. The sensor 180 provides an acceleration signal and an analog movement measurement signal derived from the X, Y and Z-axis measurement values of the portable terminal to the HDD controller 150 after detection of the movement in the third embodiment of the present invention.

The HDD controller 150 controls the HDD 170. Under the control of the second controller 140, the HDD controller 150 reads data from the HDD 170 or writes data on the HDD 170.

In accordance with the third embodiment of the present invention, the HDD controller 150 provides the acceleration signal received from the sensor 180 to the second controller 140. The HDD controller 150 includes an ADC. In the third embodiment of the present invention, the ADC converts an analog movement measurement signal received from the sensor 180 to a digital movement measurement signal and provides the digital movement measurement signal to the second controller 140. The HDD controller 150 also parks the HDD 170 under the control of the second controller 140, thereby protecting the HDD 170 against damage. The HDD controller 150 may be a TIC.

The second controller 140 determines the movement of the portable terminal based on the acceleration signal received from the HDD controller 150. The second controller 140 determines whether to park the HDD 170 based on the digital movement measurement signal received from the ADC of the HDD controller 150.

After determining to park the HDD 170 according to the movement measurement signal, the second controller 140 controls the HDD controller 150 to park the HDD 170. After determining not to park the HDD 170 according to the movement measurement signal, the second controller 140 leaves the HDD 170 unparked, considering that the movement of the portable terminal will not damage the HDD 170.

The second controller 140 decides not to park the HDD 170 when the movement measurement signal received from the sensor 180 indicates that the user is walking, jogging, or driving or that the movement is causing a load not greater than the limit load of the HDD 170, for example, at or below a limit load of about 200 g for a 3 GB HDD.

The second controller 140 can control the PDA functionality under the control of the first controller 110 when the portable terminal co-functions as a PDA, as described before.

To the process of determining whether the HDD is to be parked in the portable terminal having the configuration illustrated in FIG. 3 will be described in great detail with reference to FIG. 5.

FIG. 5 is a flowchart illustrating an operation for judging whether to park or unpark the HDD in the portable terminal according to the exemplary embodiment of the present invention.

Referring to FIGS. 3 and 5, if the portable terminal makes a movement, the sensor 180 detects the movement in step 401. In step 402, the sensor 180 senses the acceleration and provides the acceleration signal to the HDD controller 150.

The HDD controller 150 provides the acceleration signal to the second controller 140 and the second controller 140 determines that the portable terminal is moving based on the acceleration signal.

The sensor 180 also provides a movement measurement signal derived from X, Y and Z-axis measurement values of the movement of the portable terminal to the ADC of the HDD controller 150. The ADC receives the movement measurement signal from the sensor 180 in step 403 and converts the analog movement measurement signal to a digital movement measurement signal and provides it to the second controller 140 in step 404.

In step 405, the second controller 140 determines whether to park the HDD 170 according to the movement measurement signal. After determining to park the HDD 170 according to the movement measurement signal in step 406, the second controller 140 controls the HDD controller 150 to park the HDD 170 in step 407. On the contrary, after determining not to park the HDD 170 according to the movement measurement signal in step 406, the second controller 140 keeps the HDD 170 unparked because the movement of the portable terminal will not damage the HDD 170.

Figure 4:
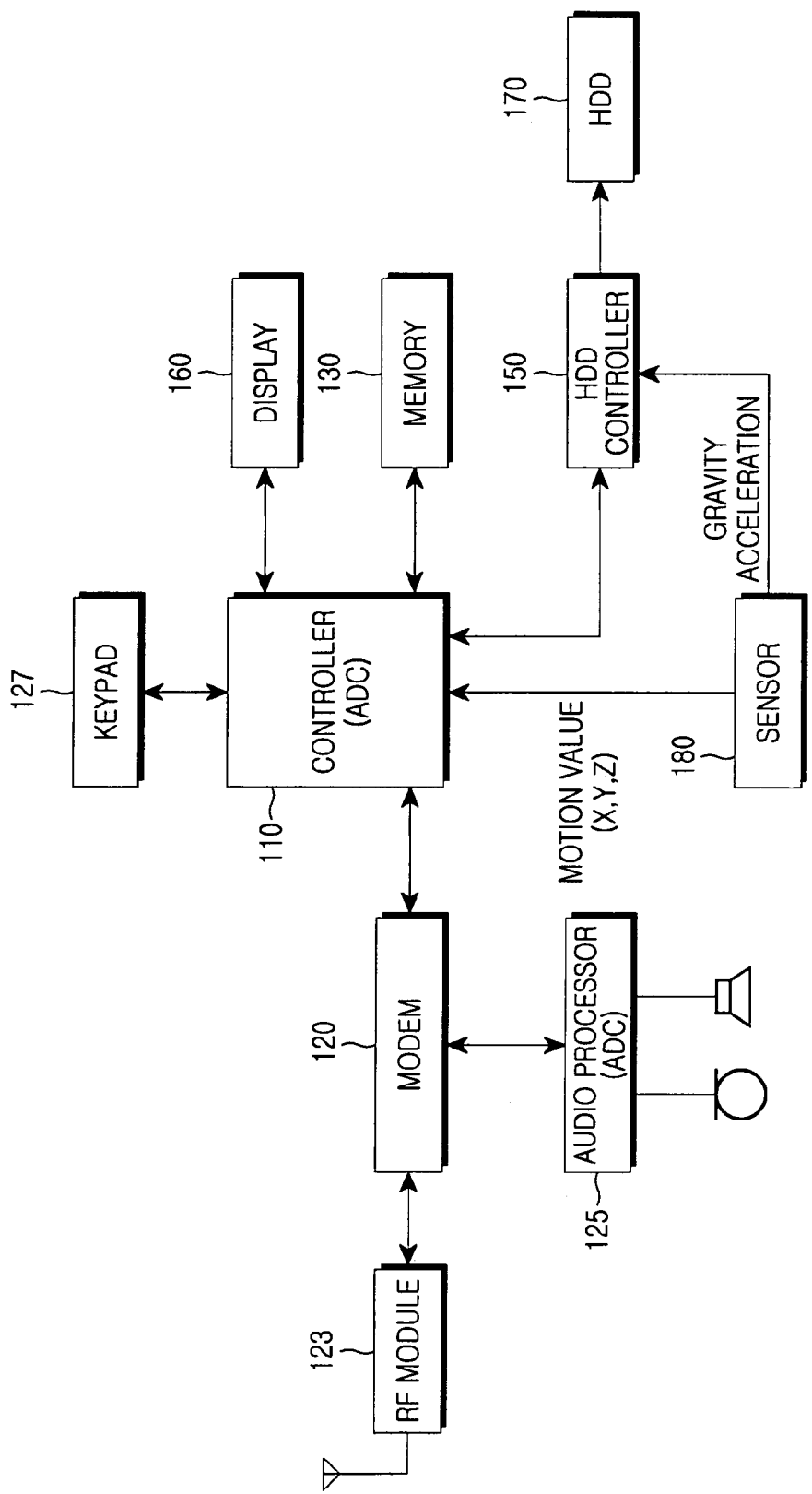
FIG. 4 is a block diagram of a portable terminal according to a fourth exemplary embodiment of the present invention.

FIG. 4 is a block diagram of a portable terminal according to a fourth embodiment of the present invention.

Referring to FIG. 4, the sensor 180 may be a three-axis (X, Y and Z axis-) acceleration sensor for detecting the movement of the portable terminal. The sensor 180 provides an acceleration signal to the HDD controller 150 and provides an analog movement measurement signal derived from the X, Y and Z-axis measurement values of the movement of portable terminal to the controller 110 after the movement detection in the fourth embodiment of the present invention.

The HDD controller 150 controls the HDD 170. Under the control of the controller 110, the HDD controller 150 reads data from the HDD 170 or writes data on the HDD 170.

In accordance with the fourth embodiment of the present invention, the HDD controller 150 provides the acceleration signal received from the sensor 180 to the controller 110. The HDD controller 150 also parks the HDD 170 under the control of the controller 110, thereby protecting the HDD 170 against damage. The HDD controller 150 may be a TIC.

The controller 110 provides overall control to the portable terminal. The controller 110 may include the MODEM 120 and the CODECs. In accordance with the fourth embodiment of the present invention, the controller 110 determines the movement of the portable terminal based on the acceleration signal received from the HDD controller 150. The controller 110 includes an ADC. The ADC converts an analog movement measurement signal received from the sensor 180 to a digital movement measurement signal according to the fourth embodiment of the present invention.

The controller 110 determines whether to park the HDD 170 based on the digital movement measurement signal. After determining to park the HDD 170 according to the movement measurement signal, the controller 110 controls the HDD controller 150 to park the HDD 170. After determining not to park the HDD 170 according to the movement measurement signal, the controller 110 leaves the HDD 170 unparked, because the movement of the portable terminal will not damage the HDD 170.

The controller 110 decides not to park the HDD 170 when the movement measurement signal received from the sensor 180 indicates that the user is walking, jogging, or driving or that the movement is causing a load not greater than the limit load of the HDD 170, for example, at or below a limit load of about 200 g for a 3 GB HDD.

The process of determining whether the HDD is to be parked in the portable terminal having the configuration illustrated in FIG. 4 will be described in great detail with reference to FIG. 5.

FIG. 5 is a flowchart illustrating an operation for determining whether to park the HDD in the portable terminal according to the exemplary embodiment of the present invention.

Referring to FIGS. 4 and 5, if the portable terminal makes a movement, the sensor 180 detects the movement in step 401. In step 402, the sensor 180 senses the acceleration and provides the acceleration signal to the HDD controller 150.

The HDD controller 150 provides the acceleration signal to the controller 110 and the controller 110 determines that the portable terminal is moving based on the acceleration signal.

The sensor 180 also provides a movement measurement signal derived from X, Y and Z-axis measurement values corresponding to the movement of the portable terminal to the ADC of the controller 110. The ADC receives the movement measurement signal from the sensor 180 in step 403 and converts the analog movement measurement signal to a digital movement measurement signal in step 404.

In step 405, the controller 110 determines whether to park the HDD 170 according to the movement measurement signal. After determining to park the HDD 170 according to the movement measurement signal in step 406, the controller 110 controls the HDD controller 150 to park the HDD 170 in step 407. On the contrary, after determining not to park the HDD 170 according to the movement measurement signal in step 406, the controller 110 keeps the HDD 170 unparked, because the movement of the portable terminal will not damage the HDD 170.

As described above, an exemplary embodiment of the present invention may park an HDD when the portable terminal makes a movement serious enough to damage the HDD.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A portable wireless communication terminal comprising:
   a sensor to detect a movement of the portable wireless communication terminal and output a first signal based on an acceleration of the movement and a second signal based on a velocity of the movement; and
   a controller to control a hard disk drive (HDD) in response to both the first and second signals.

2. The portable wireless communication terminal of claim 1, further comprising an audio processor, the audio processor comprising an analog-to-digital converter (ADC) adapted to receive an audio signal, wherein the second signal is an analog signal and the ADC converts the second signal to a digital signal.

3. The portable wireless communication terminal of claim 1, wherein the controller comprises an analog-to-digital converter adapted to receive and convert the second signal to a digital signal.

4. The portable wireless communication terminal of claim 1, further comprising a second controller coupled between the first controller and the HDD to receive the first signal and control the hard disk drive in response to an output of the first controller.

5. The portable wireless communication terminal of claim 1, wherein the controller is adapted to determine whether the movement acceleration is over a threshold value.

6. The portable wireless communication terminal of claim 1, wherein the controller is adapted to determine, after determining that the movement acceleration is over a threshold value, whether to park the HDD based on the movement velocity.

7. The portable wireless communication terminal of claim 1, wherein the controller is adapted to determine whether to park the HDD based on the movement velocity.

8. The portable wireless communication terminal of claim 1, further comprising an RF module adapted to receive and transmit signals and coupled to the controller.

9. A method comprising:
   detecting a movement of a portable wireless communication terminal and outputting a first signal based on an acceleration of the movement and a second signal based on a velocity of the movement; and
   controlling a hard disk drive (HDD) in response to both the first and second signals.

10. The method of claim 9, further comprising the step of converting the second signal to a digital signal with an analog-to-digital converter (ADC) of an audio processor, wherein the ADC is adapted to receive an audio signal and the second signal is an analog signal.

11. The method of claim 9, further comprising the step of converting the second signal to a digital signal with an analog-to-digital converter (ADC) of a controller coupled to the HDD, wherein the second signal is an analog signal.

12. The method of claim 9, further comprising the step of controlling the HDD by using a second controller coupled between a first controller and the HDD, the second controller receiving the first signal and controlling the hard disk drive in response to an output of the first controller.

13. The method of claim 9, wherein the controlling step comprises determining whether the movement acceleration is over a threshold value.

14. The method of claim 9, wherein the controlling step comprises determining, after determining that the movement acceleration is over a threshold value, whether to park the HDD based on the movement velocity.

15. The method of claim 9, wherein the controlling step comprises determining whether to park the HDD based on the movement velocity.

16. The method of claim 9, further comprising receiving and transmitting signals with an RF module coupled to a controller for performing the step of controlling the HDD.

* * * * *